UNITED STATES PATENT OFFICE.

JOHN M. TAYLOR, OF BRIDGEPORT, PENNSYLVANIA.

PLASTIC COMPOSITION AND METHOD OF MAKING IT.

1,172,073. Specification of Letters Patent. Patented Feb. 15, 1916.

No Drawing. Application filed January 14, 1915. Serial No. 2,216.

*To all whom it may concern:*

Be it known that I, JOHN M. TAYLOR, a citizen of the United States, residing in Bridgeport, Pennsylvania, have invented certain Improvements in Plastic Compositions and Methods of Making Them, of which the following is a specification.

One object of my invention is to provide a relatively inexpensive and easily manufactured solid compound, which among other uses, is available as an ingredient of varnishes and as a binding or impregnating substance for connecting the laminæ of built-up sheets or plates of fiber or other material. This compound is similar in many respects to shellac as regards its properties, characteristics and uses; a further object of my invention being to provide a novel method or process of preparing the above compound.

In carrying out my invention I first prepare a solution of cellulose in a suitable solvent. For example, I may treat ten pounds of cellulose, in the form of bleached cotton or wood pulp, with an excess of a 15% to 20% solution of caustic soda, thereafter squeezing it until it contains about three times its weight of the latter. The saturated alkali cellulose is then transferred to a closed vessel where there is added to it about half its weight or approximately twenty pounds of carbon bisulfid. After this mixture has been allowed to stand for from six to eight hours at room temperature, I preferably though not necessarily add sufficient water to cover the mass, and then to this semi-liquid or jelly-like mass add approximately twenty-five pounds of a mixture of substantially equal parts of phenol and formaldehyde, although the proportions of these ingredients may be varied to some extent without departing from my invention. Any of the homologues of phenol, or any of the polymers of formaldehyde, may be employed in place of phenol and formaldehyde respectively.

When it is desired to obtain the improved compound in solid form, the syrupy liquid resulting from the above noted reactions is heated until solidification takes place; being subjected to pressure if necessary during or after such heating, or otherwise treated to make it dense and uniform in texture. The resulting solid may be cut, molded, or otherwise shaped into any desired form. If desired the heating above referred to may be continued only long enough to cause the liquid compound to become thick and viscous, as it may in many cases be used in this form.

The compound resulting from my process is similar in quality and appearance to shellac, being soluble in alcohol, benzol and other ordinary organic solvents, although insoluble in water. It may be colored by anilin dyes or by other suitable means, possesses a relatively high mechanical strength, is infusible at ordinary temperatures, is a non-conductor of electricity, is of a hard dense texture, may be cut, sawn and otherwise worked into shape, and is capable of receiving a high polish.

It may be used as an ingredient in the manufacture of varnishes, as well as for other purposes for which shellac is commonly employed, and in its liquid form it is particularly useful to bind together and impregnate sheets of paper, vulcanized fiber or other material in the manufacture of laminated plates, sheets or tubes of any desired thickness. In such case the syrupy liquid resulting from the mixture of viscose, phenol and formaldehyde in the desired amounts is applied to the thin sheets by means of a brush, or by soaking them in the liquid for a suitable time. After such application, said sheets are superposed and subjected to suitable heat and pressure necessary to harden the binder as well as to give the product the desired final form.

The improved composition of matter resulting from the admixture of the prescribed ingredients in the manner noted may also be used in its solid form as a binder; either in a powdered, granulated or flaky condition. In such case the powdered, granulated or flaky material is placed between the sheets or other bodies to be connected, and with them is subjected to sufficient heat and pressure to cause it to soften or become viscous so as to effect the desired adherence of said sheets or bodies.

I claim:—

1. The process which consists in mixing viscose with phenol or its homologues, and formaldehyde, and heating the resulting mass until it solidifies.

2. The process which consists in mixing viscose with substantially equal parts of phenol and formaldehyde, and heating the resulting mass to form a solid body.

3. The process which consists in mixing viscose with phenol and formaldehyde and then heating the mass to form a solid body.

4. The process which consists in mixing viscose with phenol and formaldehyde and treating the resulting mass to solidify it.

5. The product resulting from the reaction of a mixture of phenol, formaldehyde and viscose, comprising a hard, dense, relatively infusible solid having properties similar to those of shellac.

6. As a new composition of matter, a solid product formed by the combination of viscose, phenol and formaldehyde under heat and comprising a relatively infusible, comparatively elastic, hard body, soluble in alcohol and benzol and insoluble in water.

In testimony whereof, I have signed my name to this specification, in the presence of two subscribing witnesses.

JOHN M. TAYLOR.

Witnesses:
EMELINE HENRY HOOVER,
AARON S. SWARTZ, Jr.